Figure 1:
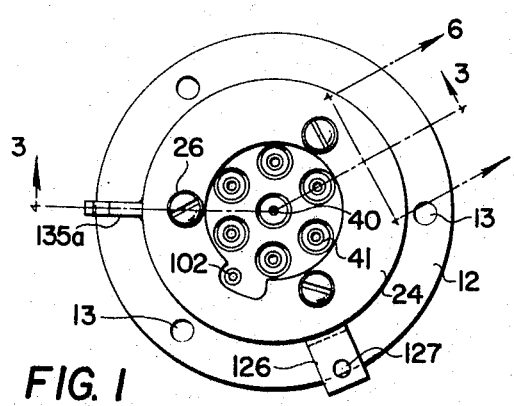

Sept. 5, 1967      R. P. HEINTZ      3,339,585

SEQUENTIAL DISTRIBUTOR CONTROL VALVES

Filed Sept. 7, 1965      2 Sheets-Sheet 1

INVENTOR.
RICHARD P. HEINTZ
BY Stephen M. Mihaly
ATTORNEY

Sept. 5, 1967  R. P. HEINTZ  3,339,585
SEQUENTIAL DISTRIBUTOR CONTROL VALVES
Filed Sept. 7, 1965  2 Sheets-Sheet 2

INVENTOR.
RICHARD P. HEINTZ
BY
ATTORNEY

United States Patent Office  3,339,585
Patented Sept. 5, 1967

3,339,585
SEQUENTIAL DISTRIBUTOR CONTROL VALVES
Richard P. Heintz, Kalamazoo, Mich., assignor to
Pneumo Dynamics Corporation, Cleveland, Ohio,
a corporation of Delaware
Filed Sept. 7, 1965, Ser. No. 485,332
13 Claims. (Cl. 137—627)

The present invention relates as indicated to a control valve and more particularly to an improved control valve finding particularly advantageous use in fuel injection systems.

As will be appreciated by those skilled in the art, fuel injection control valves must necessarily provide a relatively high degree of accuracy in fuel delivery to the several injector valves with which it communicates while simultaneously possessing dependability in use to avoid frequent and costly maintenance. Present control valves generally conforming to these requirements are characterized by the presence of numerous relatively precisely machined component parts, for example lapped or matched beveled fits or seats, which not only increases machining and thus ultimate valve costs but simultaneously renders the valve more susceptible to clogging and the like caused by fluid contaminants.

With the above in mind, a primary object of the present invention is to provide an improved control valve in which the component parts are constructed and arranged so as to eliminate matched or lapped seats thereby to adapt the component parts of the valve to high production techniques thereby significantly reducing ultimate manufacturing costs.

A further object of the present invention is to provide a control valve which is insensitive to contaminants in the fluid received and distributed by the control valve.

A further, more specific object of the present invention is to provide a valve having a poppet actuating assembly in the form of a rotor cam and coacting cam follower, the rotor cam being constructed and mounted on the rotor so as to avoid costly machining and being formed with a cam face specifically designed for variation in the injection period upon relative vertical movement between the rotor and stator members.

Another object of the present invention is to provide a control valve having readily accessible means for providing such relative vertical movement between the rotor and stator to vary duration of fuel supply to the several injector valves controlled by the control valve, as well as to control the relative rotative positions of the rotor and stator so as to control injection timing, that is, the period in the cycle during which the pressurized fuel is delivered to each of the several injector valves.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
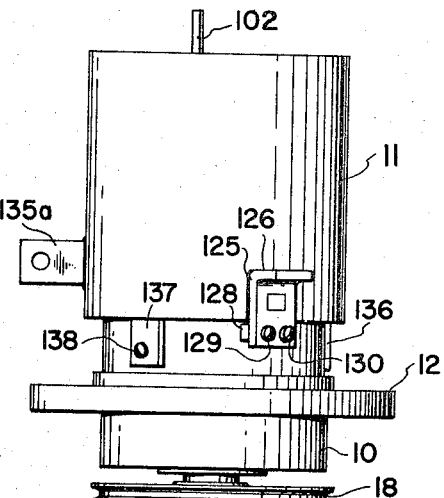
Figure 3:
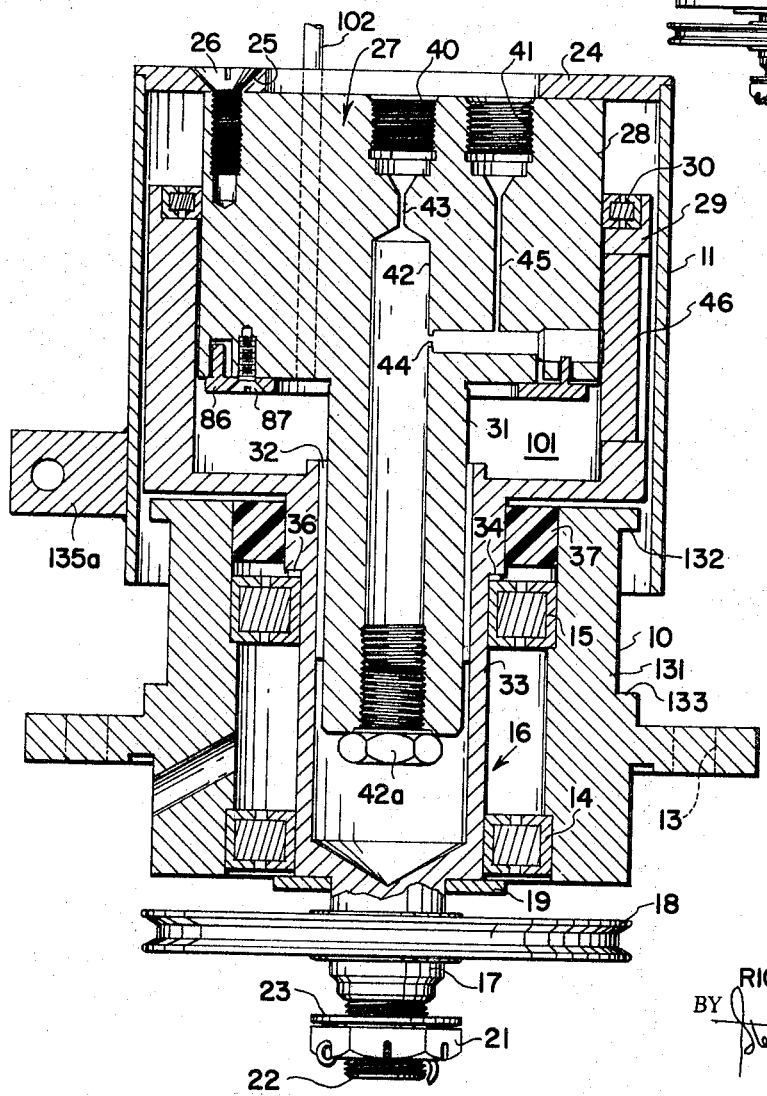
Figure 4:
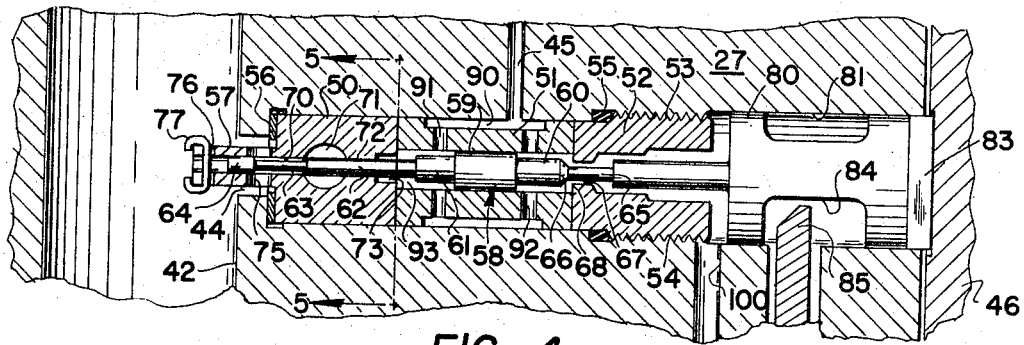
Figure 5:
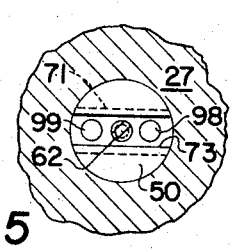
Figure 6:
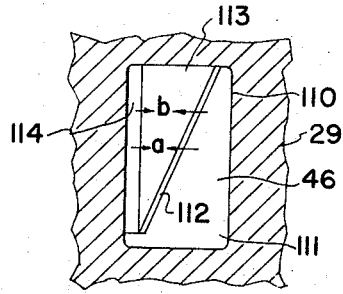
Figure 7:
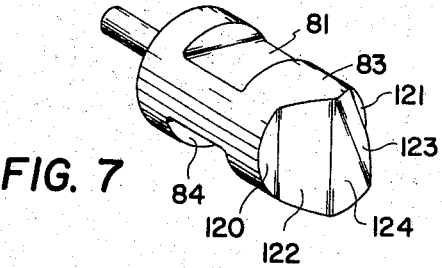
Figure 8:
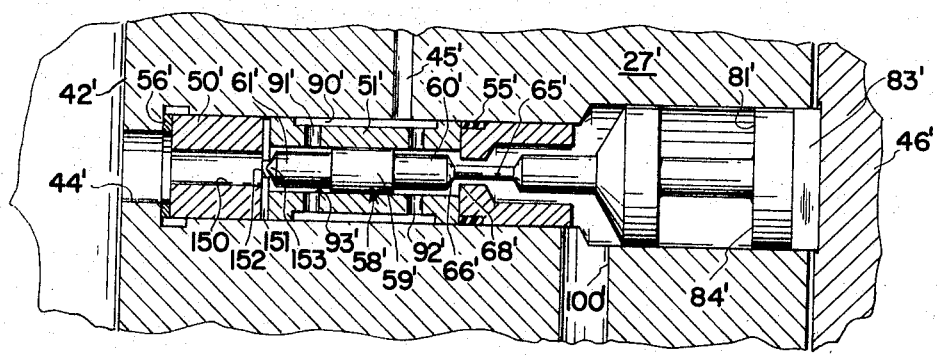

In said annexed drawings:

FIG. 1 is a top plan view of the control valve of the present invention;
FIG. 2 is a side elevational view of the control valve;
FIG. 3 is a sectional view taken on line 3—3 of FIG. 1;
FIG. 4 is a fragmentary enlarged view showing the controlled fuel supply from the pump supply line to one of the valve outlet lines;
FIG. 5 is a sectional view taken on line 5—5 of FIG. 4;
FIG. 6 is a fragmentary elevational view of the cam rotor;
FIG. 7 is a fragmentary perspective view of the cam end of the follower, and
FIG. 8 is a fragmentary enlarged view similar to FIG. 4, showing a modified valve assembly.

Referring now in more detail to the drawings, wherein like parts are indicated by like reference numerals, the control valve of the present invention comprises a lower housing 10 and an upper housing in the form of a cover 11 adjustably mounted relative thereto. The bottom housing 10 is formed with an enlarged mounting flange 12 provided with a plurality of circumferentially spaced openings commonly designated at 13 through which mounting bolts or the like (not shown) can pass for mounting the valve to a suitable mounting surface, the mounting environment of the valve forming no part of the present invention.

Referring to FIG. 3, the lower housing 10 is generally cylindrical and is formed to receive spaced bearings 14 and 15 for rotatably supporting a rotor generally indicated at 16. In the form shown, the lower section 17 of the rotor extending from the lower housing 10 is adapted to drivingly receive a pulley 18 by means of which the rotor is driven. Washers 19 and 20 are spaced on either side of the pulley 18, and a shear nut 21 is received on the threaded end 22 of the rotor shaft and retained by cotter pin 23, all in a well-known manner.

The cover 11 includes a top plate portion 24 which is formed with a plurality of countersunk openings 25 through which mounting screws 26 extend for mounting to the housing a stator generally indicated at 27. The relatively enlarged upper portion 28 of the stator is peripherally spaced from the upper housing 11 to freely receive the uppermost enlarged portion 29 of the rotor 16. The extreme upper end of the rotor portion 29 mounts a seal 30.

The stator 27 further includes a relatively reduced bottom section 31 adapted to receive a sleeve bearing 32 which rotatably supports an intermediate section 33 of the rotor 16. The rotor is axially spaced in the housing by a plurality of shims 34, as required, disposed between the upper bearing 15 and an enlarged shoulder portion 36 formed on the rotor. A seal 37 seals the rotor in this area.

The upper portion 28 of the stator is formed with a central fuel supply opening 40 and a plurality, six as shown, of outwardly, equally spaced fuel outlet openings 41 each of which communicates with a fuel injector valve (not shown) forming a further component of the fuel injection system. It will be understood that suitable inlet and outlet adapter couplings or fittings are adapted to be threadedly connected to the valve at the respective fuel inlet and outlet openings in conventional arrangement. The fuel supply opening 40 communicates with a source of pressurized fuel such as, for example, a high-pressure pump capable of delivering fuel to the control valve under pressures in excess of 20,000 p.s.i. In a manner to be hereinafter described, the pressurized fuel is delivered cyclically to each of the respective outlets 41 to control the fuel injection system.

The central supply opening 40 communicates with an axial central passage 42, closed at its bottom end by a retainer plug 42a, through a relatively reduced passage 43, with the main axial passage 42 in turn communicating with a plurality of transversely extending passages commonly designated at 44, there being one such transverse passage 44 for each control outlet 41. Each such transverse passage 44 is adapted to sequentially communicate with its associated outlet opening 41 through passages 45 spaced concentrically around and coaxial with the main axial supply passage 42. In operation, as will be hereinafter detailed, each outlet passage 45 is in pressure communication with the central passage 42 except for the injection period for the particular injector valve communicating with such outlet passage, during which time the outlet passage is shut off from the fuel under pressure and connected to drain. The mechanism for sequentially controlling the fuel delivery to the several passages 45 and outlet openings 41 will be described hereinafter when specific reference is made to FIG. 4. Such mechanism is actuated by a rotor cam 46 carried by the enlarged portion 29 of the rotor 16.

Referring now to FIG. 4, each of the several transverse openings 44 is adapted to receive, in radially outward order, a sleeve 50, a poppet guide 51 and a poppet seat member 52. The latter is exteriorly threaded as indicated at 53 for threaded mounting of the seat in a mating threaded section 54 of the transverse opening 44. A seal 55 is employed to seal the connection. A gasket 56 is provided at the forward end of the sleeve 50 for sealing the same in the opening 44.

The sleeve 50 is provided with a forward end portion 57 which extends into the passage 42, with the sleeve, including such forward end portion, the poppet guide 51, and the poppet seat 52 being axially bored to receive an irregular shaped poppet member generally indicated at 58. The poppet includes a central, relatively enlarged section 59, relatively smaller sections 60 and 61 on either side thereof, and a preferably separate part having portions 62 and 64 of corresponding diameter and an intermediate, reduced portion 63. Disposed outwardly of the section 60 is a reduced section 65, with a beveled poppet seat 66 being formed between these latter two sections.

The poppet seat member 52, which is in the nature of a sleeve internally formed with stepped diameter portions, has a relatively reduced forward opening 67 the diameter of which is intermediate the diameters of the sections 60 and 65 of the poppet whereby the leading edge 68 defining the forward region of such opening 67 effectively provides a seat for the beveled section 66 of the poppet.

The sleeve 50 is formed with an axially extending forward cylindrical opening 70, a central, transversely extending cylindrical opening 71, an axial cylindrical opening 72 communicating with the opening 71, and a relatively enlarged slot or recess 73. As seen in FIG. 4, the reduced section 63 of the poppet is loosely received within the forward opening 70. The adjacent poppet section 62 generally corresponds in diameter to the cylindrical opening 70 whereby the poppet section 62 when slidably received therein effectively shuts off the flow of pressurized fuel to the associated outlet passage 45. In the illustrated position of the poppet, it will be seen that fuel entering the passage or opening 70 around the section 63 of the poppet can pass to the transverse cylindrical opening 71 of the sleeve for passage to the outlet passage 45 as will be presently described. Although the beveled seat 66 of the poppet is shown unseated in FIG. 4, it will be understood that during pressurization the poppet seat 66 will be seated.

The forward end 57 of the sleeve 50 is axially bored to receive the forward end 64 of the poppet, with such forward end being additionally transversely slotted as indicated at 75 to provide a flow passage intercommunicating the central axial supply passage 42 and the passage 70 formed in the sleeve 50. The forward end 57 of the sleeve is additionally slotted as indicated at 76 for receiving a wire stop member 77 which is crimped to the sleeve as shown, with the stop member functioning to limit the forward movement of the poppet when the same is actuated by the rotor cam.

A cam follower 80 is slidably mounted in the outer, relatively enlarged portion 81 of the transverse opening 44, with the cam follower including a forward, reduced end 82 adapted to engage and actuate the poppet, and an outer end 83 adapted to be contacted by the rotor cam 46 when the same has been rotated to a position radially outwardly therefrom. The cam follower 80 is formed with an elongated, relatively narrow slot 84 for receiving a follower guide member 85 which functions to prevent rotation of the cam follower during axial movement thereof. Referring back to FIG. 3, a follower guide 85 is provided for each poppet assembly and the several guides 85 are in the form shown integrally formed with a follower guide plate 86 which is rigidly mounted to the stator 27 by a plurality of mounting bolts commonly designated at 87.

Referring now to the manner in which fuel is sequentially delivered to the respective outlet passages 45 formed in the stator 27, reference again being made to FIG. 4, the poppet guide 51 is formed with an annular outer recess 90 an arcuate portion of which axially overlaps the associated outlet passage 45. The poppet guide is further formed with a forward series of transverse ports commonly designated at 91 and a rear series of transverse ports 92 which respectively communicate with the annular recess 90 relatively adjacent the opposite end thereof. The poppet guide is formed with a smooth cylindrical bore 93 which slidingly receives the enlarged section 59 of the poppet. It will thus be seen that in the FIG. 4 position of the poppet, fuel entering the forward end of the bore 93 of the poppet guide freely passes through the transverse ports 91 to the annular passage 90 and the outlet passage 45. As above noted, the poppet 58 is shown in FIG. 4 in a relatively intermediate position, and during the periods when the outlet passage 45 is pressurized, the beveled seat 66 of the poppet 58 engages the front edge 68 of the poppet seat member 52, whereby fuel delivered to the annular passage 90 is prevented from passage to the interior of the poppet seat member 52.

Referring to FIG. 5, the sleeve 50 is formed with a pair of axial passages 98 and 99 which communicate at one end with the generally cylindrical shaped, transverse opening 71 and which extend through the sleeve to communicate with the slot 73. It will thus be seen that fuel delivered to the sleeve 50 during the pressurizing cycle passes through the cylinder 71, and axial passages 98 and 99, bore 93, transverse ports 91, and annular passage 90 to the outlet passage 45.

The stator 27 is formed with a plurality of drain openings commonly designated at 100 concentrically spaced relative to the central passage 42 and communicating with the transverse passages 44 in the area of the poppet seat members 52. Each such passage 100 empties into an annular chamber 101 below the relatively enlarged section 28 of the stator, with openings as required to effect such emptying being formed in the plate 86. During the injection cycle, the poppet 58 is moved inwardly by the rotor cam 46 thereby unseating the beveled seat portion 66 thereof and establishing communication between the outlet passage 45, the annular passage 90, the ports 92, the bore 93 of the poppet guide and the interior of the poppet seat member. Inward motion of the poppet 58 also causes section 62 to be slidably received within opening 70 preventing flow of pressurized fuel. The fuel empties from the interior of the poppet seat member into the associated drain passage 100 and drain chamber 101. The fuel drain can be delivered from the chamber 101 in any suitable well-known manner, for example by drain pipe 102 mounted in the stator and extending upwardly therefrom.

As perhaps best shown in FIG. 6, the rotor portion 29 is formed with a generally rectangular opening 110 which receives the rotor cam 46. The latter includes a major flat portion 111 preferably coplanar with the rotor surface when the rotor cam is mounted in place, an obliquely directed ramp surface 112, a raised, flat, generally triangular surface 113, and a leading ramp surface 114. An important feature of the rotor cam of the present invention resides in the elimination of precise and costly machining heretofore required to produce the cam surface on the rotor. In accordance with the invention, the rotor cam 46 is separately machined and mounted in the rotor opening 110 so that the leading, flat face 113 of the rotor cam 46 contacts the adjacent surface of the stator, there being an annular clearance between the latter and the rotor proper. While held in this stator contacting position, the rotor cam is epoxied or otherwise secured in place so that the required stroke of the cam follower is established. Precise machining of the rotor is thus eliminated. The importance of the generally triangular shape of the forward face 113 of the rotor cam will be hereinafter made apparent.

Referring to FIG. 7, the end 83 of the cam follower is also multi-faced, comprising opposite side portions 120 and 121 generally normal to the axis of the follower, beveled sections 122 and 123, and an outermost, central flat section 124. During valve operation, the rotor cam 46 passes over the cam follower end in a direction so as to first contact the beveled surface 122, then the outer flat face 124, and finally the opposite beveled face 123. The cam follower, and thus the poppet movable thereby, is thus gradually cammed in, with the poppet being in its radially inward, fuel-blocking position when the flat surface 113 of the rotor cam 46 is in contact with the radially outer flat surface 124 of the cam follower.

The bevel angle of the surface 122 of the cam follower and the surface 114 of the cam rotor are preferably mated so as to provide aligned contact between the surfaces during the camming operation, thereby avoiding abrupt movement of the cam follower. The beveled faces 123 of the cam follower and 112 of the cam rotor are also preferably mated to provide line contact when the cam rotor drops off from the radially outer flat face 124 of the cam follower. The complementary beveled surfaces on the cam follower and rotor cam thus provide what is in effect the ramp-like movement of the cam over the respective faces 122, 124 and 123 of the cam follower.

As well understood by those skilled in the art, and as briefly noted above, the injection period for a particular injector valve depends upon and is controlled by the time period during which fuel delivery to such injector valve is cut off, as controlled by the control valve. Thus, the pressurized fuel is cut off to the outlet passage 45, and thus the injector valve communicating therewith, when the poppet is moved by the cam follower to a position wherein the section 62 of the poppet is received within the opening 70 formed in the sleeve 50, as above described. It will be apparent that the time or duration which the poppet is in its radially inward position blocking the flow of pressurized fuel to the outlet passage 45 is controlled by the time of duration of contact between the flat surfaces 113 and 124 of the cam rotor and cam follower, respectively. The flat surface 113 of the rotor cam is substantially greater in its longest dimension than the diameter of the cam follower, and the flat forward surface 124 of the follower engages a relatively small area on the flat surface 113. Therefore, by vertically moving the rotor cam and cam follower relative to each other, the area of the flat face 113 which engages the flat outer face 124 of the cam follower can be varied. Referring to the cam follower and rotor cam as shown in FIGS. 6 and 7, respectively, if the stator 27 is moved vertically upwardly relative to the outer portion 29, it will be seen that the cam follower will engage a relatively greater lateral area on the rotor cam face 113, resulting in the poppet cutting off pressurized fuel flow to the outlet passage 45 for a relatively longer time, thereby lengthening the injection period. Referring to FIG. 6, assuming that the center of the cam follower initially contacts the flat face 113 of the rotor cam in the area a, vertically upward movement of the stator 27 by means to be presently described will result in the center of the cam follower engaging the flat surface 113 of the rotor cam in the area b. The cam follower, and thus the poppet 58, is thus retained in its radially inward, seated position for a relatively longer period of time, thereby consequently increasing the time during which the outlet passage 45 is cut off from the pressurized fuel and communicates with the drain passage 100.

In the form shown, referring to FIG. 2, a generally L-shaped bracket 125 is mounted on the cover 11. The laterally extending leg portion 126 of the bracket can be suitably connected to a means for vertical adjustment, the leg 126 being provided with an opening 127, seen in FIG. 1, to facilitate such connection. In this manner the stator 27 and cam follower carried thereby can be vertically adjusted relative to the rotor cam to vary the cammed period of the cam follower thereby varying the duration of the injection period.

In order to limit the vertical movement of the cover 11 relative to the rotor portion 29, a stop member 128 is mounted on the bracket 125 adjacent the bottom thereof by means of screws 129 and 130. The stop member 128 is received in an annular groove or recess 131 formed in the bottom housing 10, with such groove being defined at the top and bottom, respectively, by shoulders 132 and 133, adapted to engage and limit the vertical travel of the stop member 128.

The injection cycle for the several injector valves can be advanced or retarded by rotation of the housing 11 relative to the rotor portion 29. Such rotation, which can be effected by suitable control means operatively connected to flange 135 which is attached to and extends outwardly from the housing 11, is effectively transferred to the stator 27 through the interconnection of these members so that the stator is consequently rotated about its vertical axis and relative to the rotor portion 29. A pair of stop plates 136 and 137 are mounted on the bottom housing 10 in the recess 131 by screws 138, such plates being arcuately positioned to be engaged by the stop member 128 carried by bracket 125 thereby to limit as desired the extent to which the housing 11 can be rotated relative to the rotor portion 29 in order to advance or retard the fuel supply to the several injector valves.

There is shown in FIG. 8 a modified means for seating of the poppet to prevent pressurized fuel from flowing to the outlet passage during the injection cycle. Much of the structure illustrated in the FIG. 8 form is the same as that previously described and illustrated in FIG. 4, and where applicable, the same reference numerals have been employed with an attached prime. In this form, the sleeve 50' is cylindrically shaped and formed with a smooth cylindrical bore 150. A thin flexible metal disc or sheet 151 is mounted in the transverse opening 44' immediately outwardly of the sleeve 50' and between the same and the poppet seat member 52'. The thin metal disc 151 is provided with a central opening 152 which effectively provides a flexible seat for the forward tapered end 153 of the section 61' of the poppet 58'. The remaining structure illustrated in FIG. 8 is as previously described.

In the operation of the FIG. 8 form, the poppet is normally urged to the right, as viewed in this figure, under the force of the pressurized fuel, with the beveled seat portion 66' of the poppet seating on the annular edge 68' of the poppet seat member 52'. Fuel entering the passageway 44' passes through the bore 150 of the sleeve 50', through the opening 152 in the flexible seat, the bore 93' formed in the poppet guide 51', the transverse ports 91', the annular passageway 90' and the outlet passage 45' which communicates with the injector valve for supplying fuel thereto. During pressurization, communication to the drain opening 100' is effectively cut off by the beveled seat 66' of the poppet.

During the injection cycle, the rotor cam 46' contacts the multi-faced end 83' of the cam follower 80' in the same manner as above described, thereby biasing the same and the poppet 58' radially inwardly, with the degree of travel being such that the inner beveled end portion 153 of the poppet contacts the annular edge defining the central opening 152 of the flexible metal disc 151 thereby flexing the disc in the area of such central opening and effecting a tight sealing of the opening to prevent fuel flow therethrough. Simultaneously, the opposite beveled end 66′ of the poppet 58′ is unseated thereby intercommunicating the outlet passage 45′ with the drain opening 100′, through the transverse ports 92′, the bore 93′ of the poppet guide and the interior of the poppet seat member. The injection period is of course terminated when the rotor cam moves out of contact with the cam follower as described, with the fuel under pressure then again forcing the poppet to move to the right, as viewed in FIG. 8, to re-establish the seating of the beveled section 66′ of the poppet on the annular edge 68′ of the poppet seat member. Fuel is then free to flow as above described from the supply passage 42′ to the outlet passage 45′ for again pressurizing the injector valve.

The flexible seat provided by the flexible metal disc 151 is advantageous for a number of reasons. Initially, the seat itself is simply a hole drilled in the thin metal sheet and hence is an extremely low-cost item. Secondly, seating of the forward end 153 of the poppet can be realized despite manufacturing imperfections and slight disalignments. Further, when the area around the central opening 152 is flexed or yielded when the beveled end 153 is seated, the force of the pressurized fuel, which of course continually enters the transverse opening 44′ formed in the stator, will exert a pressure on the opposite face of the flexible sheet or disc which will urge the same against the poppet thereby affording a tight seal to prevent leakage of the fuel through the opening. Perhaps the most important feature of the flexible seat arrangement is the ability of the flexible sheet 151 to flex to varying degrees dependent upon the travel of the poppet. By such an arrangement, tolerances in manufacturing of the various members producing travel of the poppet can be easily accommodated by the flexible sheet member 151, with a tight seating being realized in all instances.

It will thus be seen that the control valve of the present invention provides distinct advantages over present control valves of this general type. The various components are designed to eliminate close tolerances thereby significantly reducing manufacturing costs. The rotor cam is separately made and is mounted in a simple yet accurate manner in the rotor to avoid otherwise necessary precise machining of the rotor and cam. The invention is further characterized by the provision of conveniently accessible means for varying the injection timing and the duration of the injection period of the several injector valves controlled by the valve of the present invention.

Other modes of applying the principle of the invention may be employed, change being made as regards the details described, provided the features stated in any of the following claims or the equivalent of such be employed.

I therefore particularly point out and distinctly claim as my invention:

1. A fuel injection control valve comprising valve housing means, a stator operatively connected to said housing therewithin and spaced therefrom to define an annular opening, said stator being formed with an axial supply passage and a plurality of fuel outlet passages, each of said plurality of fuel outlet passages communicating with said supply passage through a transverse passage formed in said stator, poppet means and cam follower means mounted in each of said transverse passages for controlling the supply of fuel from said supply passage to the associated fuel outlet passage, said cam follower means being biased by the pressurized fuel to a position wherein the radially outer end thereof extends into said annular opening, rotor means mounted for rotation within said housing and having an annular upper end portion extending into said annular opening between said stator and said housing, said rotor having mounted thereon a separately formed cam member extending inwardly from the bore of said upper end of said rotor section and adapted to engage during rotation of said rotor the radially outer end of said cam follower for moving said cam follower and said poppet means radially inwardly toward said supply passage, and means cooperating with said poppet means for shutting off the flow of pressurized fuel from said supply passage to said associated outlet passage when said poppet means has been actuated by said rotor cam to such radially inward position.

2. The combination of claim 1 wherein said separately formed cam member is positioned within an opening provided therefor in said rotor while the latter is operatively mounted within said housing, adhesive means for mounting said cam in such position, the radially inner camming face of said cam member being contiguous the outer periphery of said stator when said cam is adhesively mounted thereby to effectively compensate for manufacturing tolerances between said stator and rotor.

3. The combination of claim 2 wherein said camming face of said cam member is defined by vertically converging side edges thereby to provide means for varying the period of contact of said face with the radially outer end of said cam follower upon relative vertical movement of said stator and rotor.

4. A fuel injection control valve comprising valve housing means, a stator operatively connected to said housing therewithin and spaced therefrom to define an annular opening, said stator being formed with an axial supply passage and a plurality of fuel outlet passages, each of said plurality of fuel outlet passages communicating with said supply passage through a transverse passage formed in said stator, sleeve means, poppet means and cam follower means mounted radially outwardly in such order in each of said transverse passages for controlling the supply of fuel from said supply passage to the associated fuel outlet passage, said cam follower being biased by the pressurized fuel to a position wherein the radially outer end thereof extends into said annular opening, rotor means mounted for rotation within said housing and having an annular upper end portion extending into said annular opening between said stator and said housing, said rotor including cam means extending inwardly from the bore of said upper end of said rotor section and adapted to engage during rotation of said rotor the radially outer end of said cam follower for moving said cam follower and said poppet means radially inwardly toward said supply passage, said poppet means and said sleeve means having telescopically arranged cylindrical portions which cooperably serve to cut off supply of pressurized fuel to the associated fuel outlet passage when said poppet means has been actuated by said rotor cam to such radially inward position.

5. The combination of claim 4 further including poppet guide and poppet seat members mounted in each of said transverse passages, said poppet guide member telescopically receiving and guiding said poppet means during travel thereof and being formed with a plurality of longitudinal and transverse passage means for sequentially intercommunicating the associated fuel outlet passage with the pressurized fuel from said supply passage and with fuel drain means dependent upon the position of said poppet means.

6. The combination of claim 5 wherein said poppet means includes a beveled seat portion formed relatively adjacent the radially outer end of said poppet means, said seat portion of said poppet means seating on an annular circular edge defining the end of an axial opening formed in the radially inner end of said poppet seat member when said poppet means is in its radially outer position under the force of said pressurized fuel.

7. A fuel injection control valve comprising valve housing means, a stator operatively connected to said housing therewithin and spaced therefrom to define an annular opening, said stator being formed with an axial supply passage and a plurality of fuel outlet passages, each of said plurality of fuel outlet passages communicating with said supply passage through a transverse passage formed in said stator, poppet means and cam follower means mounted in each of said transverse passages for controlling the supply of fuel from said supply passage to the associated fuel outlet passage, said cam follower being biased by the pressurized fuel to a position wherein the radially outer end thereof extends into said annular opening, rotor means mounted for rotation within said housing and having an upper annular end portion extending into said annular opening between said stator and said housing, said rotor including cam means extending inwardly from the bore of said upper end of said rotor section and adapted to engage during rotation of said rotor the radially outer end of said cam follower for moving said cam follower and said poppet means radially inwardly toward said supply passage, means cooperating with said poppet means for shutting off the flow of pressurized fuel from said supply passage to said associated outlet passage when said poppet means has been actuated by said rotor cam to such radially inward position, and means for vertically adjusting said stator relative to said rotor and said cam means, said cam means being constructed and arranged to vary the period of poppet actuation in accordance with an in response to such vertical adjustment.

8. The combination of claim 7 further including means for rotating said stator relative to said rotor for advancing or retarding the actuation of a particular poppet means thereby to variably control the timing of the pressurization of the several fuel outlet passages.

9. A fuel injection control valve comprising valve housing means, a stator operatively connected to said housing therewithin and spaced therefrom to define an annular opening, said stator being formed with an axial supply passage and a plurality of fuel outlet passages, each of said plurality of fuel outlet passages communicating with said supply passage through a transverse passage formed in said stator, poppet means and cam follower means mounted in each of said transverse passages for controlling the supply of fuel from said supply passage to the associated fuel outlet passage, said cam follower being biased by the pressurized fuel to a position wherein the radially outer end thereof extends into said annular opening, rotor means mounted for rotation within said housing and having an annular upper end portion extending into said annular opening between said stator and said housing, said rotor having mounted thereon a separately formed cam member extending inwardly from the bore of said upper end of said rotor section and adapted to engage during rotation of said rotor the radially outer end of said cam follower for moving said cam follower and said poppet means radially inwardly toward said supply passage, and flexible seat means cooperating with said poppet means for shutting off the flow of pressurized fuel from said supply passage to said associated outlet passage when said poppet means has been actuated by said rotor cam to such radially inward position.

10. The combination of claim 9 wherein said flexible seat means comprises a relatively thin metallic member mounted in each of said transverse passages, said metallic member being formed with a central opening for receiving the front beveled end of said poppet means for seating the same.

11. A fuel injection control valve comprising valve housing means, a stator operatively connected to said housing therewithin and spaced therefrom to define an annular opening, said stator being formed with an axial supply passage and a plurality of fuel outlet passages, each of said plurality of fuel outlet passages communicating with said supply passage through a transverse passage formed in said stator, poppet means and cam follower means mounted in each of said transverse passages for controlling the supply of fuel from said supply passage to the associated fuel outlet passage, said cam follower being biased by the pressurized fuel to a position wherein the radially outer end thereof extends into said annular opening, rotor means mounted for rotation within said housing and having an annular upper end portion extending into said annular opening between said stator and said housing, said rotor having mounted thereon a separately formed cam member extending inwardly from the bore of said upper end of said rotor section and adapted to engage during rotation of said rotor the radially outer end of said cam follower for moving said cam follower and said poppet means radially inwardly toward said supply passage, means cooperating with said poppet means for shutting off the flow of pressurized fuel from said supply passage to said associated outlet passage when said poppet means has been actuated by said rotor cam to such radially inward position, and means for vertically adjusting said stator relative to said rotor thereby to vary the contact areas of said cam follower and said rotor cam.

12. The combination of claim 11 wherein said separately formed and mounted rotor cam is formed with a leading, generally triangular shape, flat cam face having downwardly converging side edges, said cam further including inclined faces extending from said edges defining said flat leading face to the main body of the cam, said inclined faces providing a ramp-like action to said cam follower when engaged by said rotor cam.

13. The combination of claim 12 wherein the radially outer end of said cam follower is formed with a generally triangular shape flat leading end and inclined adjacent faces, the inclination of such faces being substantially complemental to the inclined faces of said rotor cam to provide relatively smooth travel of said cam follower and said poppet means actuated thereby.

References Cited

UNITED STATES PATENTS

| | | | |
|---|---|---|---|
| 1,652,845 | 12/1927 | Vennum | 137—627 X |
| 1,871,265 | 8/1932 | Frelin | 137—627 |
| 2,206,361 | 7/1940 | Mackay | 137—627 |
| 2,248,528 | 8/1941 | Gordon | 137—627 X |
| 2,333,895 | 11/1943 | Smith | 137—627 |

ALAN COHAN, *Primary Examiner.*